United States Patent [19]

Hess

[11] 4,214,152
[45] Jul. 22, 1980

[54] ERROR CORRECTION IN A REMOTE METER READING DEVICE

[75] Inventor: Donald T. Hess, Garden City, N.Y.

[73] Assignee: Cain Encoder Company, Greenville, N.C.

[21] Appl. No.: 905,538

[22] Filed: May 12, 1978

[51] Int. Cl.² ............................................. G06M 3/12
[52] U.S. Cl. ........................... 235/92 EC; 235/92 PL; 235/92 ST; 235/92 MP; 340/347 P
[58] Field of Search ......... 235/92 PL, 92 ST, 92 EA, 235/92 MT, 92 MP, 92 EC; 340/210, 207 P, 208, 347 P; 346/14 MR

[56] References Cited

U.S. PATENT DOCUMENTS

| | | | |
|---|---|---|---|
| 3,170,155 | 2/1965 | Smith et al. | 340/347 P |
| 3,274,584 | 9/1966 | Morgan et al. | 340/347 P |
| 3,603,978 | 9/1971 | Narukiyo | 340/347 P |
| 3,683,368 | 8/1972 | Ebner | 340/347 P |
| 3,686,665 | 8/1972 | Elias et al. | 235/92 PL |
| 3,719,807 | 3/1973 | Daley | 235/92 PL |
| 3,846,788 | 11/1974 | Calabro et al. | 340/347 P |
| 3,898,649 | 8/1975 | Beck | 340/347 P |
| 4,007,454 | 2/1977 | Cain et al. | 340/200 |

Primary Examiner—Joseph M. Thesz
Attorney, Agent, or Firm—Kenyon & Kenyon

[57] ABSTRACT

In a remote meter reading device involving a plurality of dials, mechanical inaccuracies in the hand position are compensated for by dividing each dial into sectors, sequentially reading each dial starting with the least significant dial and adding, to each subsequent reading after the first, a correction factor based on the sector of the dial pointer of the previous reading.

27 Claims, 3 Drawing Figures

|        | READING | CHANGE | RESULT | OUTPUT |
|--------|---------|--------|--------|--------|
| FIRST  | 2.3     |        |        | 2      |
| SECOND | 9.8     | +.3    | 10.1   | 0      |
| THIRD  | 9.3     | +.3    | 9.6    | 9      |
| FOURTH | 5.1     | +9.7*  | 14.8   | 4      |
|        |         |        |        | 4902   |

\* EQUIVALENT TO −.3

ERROR CORRECTION IN A REMOTE METER READING DEVICE

BACKGROUND OF THE INVENTION

This invention relates to remote meter reading in general and more particularly to an improved remote meter reader which provides an accurate reading output at the meter. In U.S. Pat. No. 4,007,454, granted to Charles Cain there is disclosed a remote meter reading system which utilizes a rotating electric field concentric with the center of rotation of the meter needle. The interaction of the meter needle with this field is utilized to obtain an indication of needle position by comparing the phase of the detected signal with that of a reference signal.

In a meter reading device of this nature a problem may arise because of mechanical inaccuracies in the meter. As will be well recognized, most meters which must be read constitute a plurality of dials (or hands) which represent, for example, kilowatt hours, tens of kilowatt hours, hundreds of kilowatt hours and thousands of kilowatt hours. In some cases the hands are not accurately aligned. For example, if the reading of the kilowatt hand is at two, having just passed zero, the tens of kilowatt dial should be 2/10's of the digital distance beyond a significant digit, say 0.2. Due to misalignment, however, the tens of kilowatt dial may, for example, be at 9.9. If the dial readings are obtained independently, errors can clearly be carried through the system. Another approach is: data from each dial is obtained with more resolution and decoded at a central location—more data must be transmitted.

SUMMARY OF THE INVENTION

The present invention provides such a method and apparatus which insures that the reading obtained at the meter is accurate and no data beyond the reading itself for each dial be outputed and no further processing of that reading need be done.

Although described in terms of meters and meter needles herein, the present invention provides an error correcting system of wide application. In general, it can be applied to any type of device having equivalent operation to that of a meter. What is meant by equivalent operation is that a device must have at least two mechanically movable indicators, the position of which is remotely read or sensed. One of the indicators must represent a less significant digit and the other indicator a more significant digit in any number system. A further characteristic of the system is that the indicators are essentially continuously moveable and that movement of the less significant indicator between the two limits results in a movement of the more significant indicator over a smaller distance. Movement of the less significant indicator through the predetermined limits a number of times equal to the base of the number system in use will result in movement of the more significant indicator a distance equal to the distance between said limits.

If one designates the distance between the limits as X and designates the base of the number system being used as N, movement of the less significant indicator through a distance of X will result in movement of the more significant indicator a distance equal to X/N.

Thus, where the indicator is a dial, and the base of the number system is 10, movement of the less significant needle through 360° ten times results in the movement of the next most significant needle through 360°.

A further characteristic of the system is that each reading is to be rounded off. For example, when working in the base ten number system, rounding off is to the nearest whole number. Thus, if a reading of 2.5 is obtained, it is rounded off to 2. One might use as a base 36, representing the 360° of a circle. In that case, it would be desired again to have the nearest whole number. For example, if the reading was 245, representing 245 degrees, it would be rounded off to 24.

The error correction system of the present invention is explained in detail herein with reference to meter dials or pointers. However, this is given only as an example of what is found to be a practical embodiment of the system. It must be remembered when reading the specification that other types of mechanical indicators which are subject to mechanical error can equally well be corrected.

In its broadest sense, using a meter with a plurality of dials as an example, the present invention uses the position of a less significant dial between zero and 360° to generate a correction bias for the device reading for the next most significant dial reading such that it will obtain a reading which is exactly half way between the two numbers which the dial is traversing if the dial is at its exact, correct mechanical position. The reading will then be displayed as the lower of the two numbers. More specifically, this is accomplished by dividing the dial into a plurality of sectors, preferably an odd number of sectors, and by then reading sequentially each dial starting with the least significant dial and adding a correction bias to each dial reading device after the first based on the sector in which the pointer of the previous dial was located.

In a meter, a full rotation of a less significant dial represents movement between two numbers on the next most significant dial. For example, assume that the least significant dial represents tenths of kilowatt hours and the next most significant represents kilowatt hours. Assume that the least significant dial is at zero and the next dial is at four. One rotation of the least significant dial from zero back to zero should move the next dial from four to five. Furthermore, when the least significant dial is at the number eight, the next most significant dial should be eight lengths of the way between four and five. When readings are obtained from the dials using an apparatus such as that in U.S. Pat. No. 4,007,454 and in accordance with the present invention, they are typically obtained to one decimal place, i.e., in the example just mentioned, in reading the next most significant dial, assuming everything was correct, the reading would be 4.8. In such a situation, the reading which is to be taken from the kilowatts dial would be 4 kilowatt hours, since the tenths dial being at 8 would give the 0.8 kilowatt hours which must be added. Thus, it is the most significant digit of the measured position which is used i.e. the 4 in the example just given. The problem is that it is possible that the next most significant dial, due to a mechanical malfunction, might not be indicating 4.8, but instead might already be at the incorrect readout of 5.0. In this case a reading of 5.8 would be obtained instead of the correct reading of 4.8.

In its broadest sense the present invention is intended to correct the dial position of a dial or hand moving between two numbers, e.g., between four and five, such that when moving between these numbers, the sensor is biased such that it detects the hand as always positioned exactly half way therebetween, e.g. at 4.5. This allows for the maximum mechanical error, i.e., plus or minus half of the distance between the two numbers. The most accurate way of doing this would be to apply a continuous correction bias. In other words, as a less significant dial moved through 360°, a continuous correction would be applied to the next most significant dial sensor to maintain its reading at the half way position. For example, if the next most significant dial was moving between four and five, when the less significant dial was at zero, a correction of +0.5 would have to be added. Similarly when the less significant dial was at 0.1, a correction of +0.4 would have to be added and so on. When the less significant dial reached a reading of 0.5, corresponding to 180°, the correction would be zero. When the dial reached six, a correction of −0.1 would have to be applied to bring the next most significant dial back to 4.5.

Although the continuous correction is the most accurate, analysis has shown that acceptably accurate results can be accomplished by a quantitizing operation. In this operation, the 360° of the dial is divided in N segments, preferably an odd number of segments. Thus, the 360° can be divided into N=3, 5, 7 etc. segments. For the moment, consider a division into five segments. Each segment or sector would include twice the distance between two adjacent numbers, i.e., there will be a segment between 0 and 2, 2 and 4, 4 and 6 and so on. The correction which is added, in accordance with this embodiment of the present invention, is approximately the average correction for the sector in question. Considering the first sector between 0 and 2. The correction for zero would be 0.5 and the correction for 2 would be 0.3. The average of the two is a correction of 0.4. Thus, in such a situation, if the first dial were at 0 or 1, the correction added would be 0.4. Similarly, between 2 and 4 the correction added would be 0.2. For example, if the dial read 2 or 3 a correction of 0.2 would be added.

It has been further discovered that sufficient accuracy can be obtained with a division into only three sectors. Theoretically, the first sector would run from the zero to 3.33. The second sector from 3.33 to 6.66 and the third sector from 6.66 back to zero. The average correction in the first sector would be the average of 0.5 and 0.166 or +0.33. In the second sector the average would be the average of +1.66 and −1.66 or zero. Similarly, in the third sector the average would be −0.133. However, in accordance with the specific embodiment of the present invention which is described in detail herein, this correction is rounded off to 0.3.

To illustrate the operation of the present invention, consider the example just given above. Assume that the least significant dial reads 2.3. Only the most significant digit is used and read out. The readout is obtained by counting in a binary coded decimal counter from a zero cross over of a reference sine wave until the zero crossing of the detected signal. The readout of the next dial then commences. However, prior to this readout if the first dial reading was either zero, 1, or 2, 0.3 is preset into the counter. If the reading was 7, 8 or 9, −0.3 is preset into the counter. This is actually done by adding 9.7. The selection of the magnitude and sign of the correction is made by comprison logic. In a manner to be more fully explained below, this, in effect, corrects for a mechanical or linearity error of 3×3.6° or 10.8°. For intermediate values of the dial reading, i.e. 3–6, no correction is made.

The same scheme of presetting the correction into a counter can be used for five or more segments. The only difference is that additional comparison logic is needed to generate additional corrections. The manner in which this can be implemented will be obvious to those skilled in the art from the detailed description below.

DETAILED DESCRIPTION OF THE INVENTION

Figure 1A:
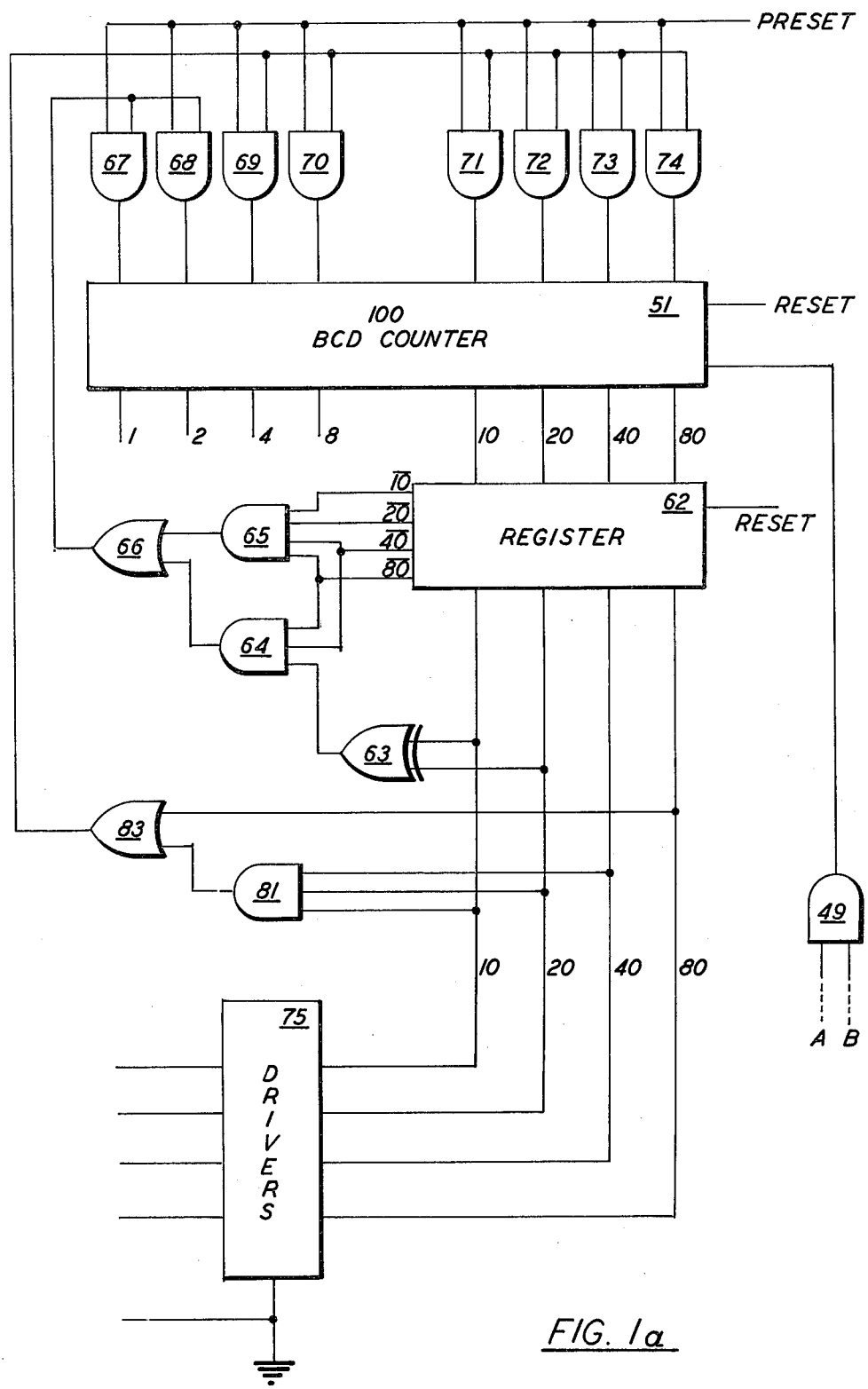
FIGS. 1a and 1b combined are a block diagram of the system of the present invention.
Figure 1B:
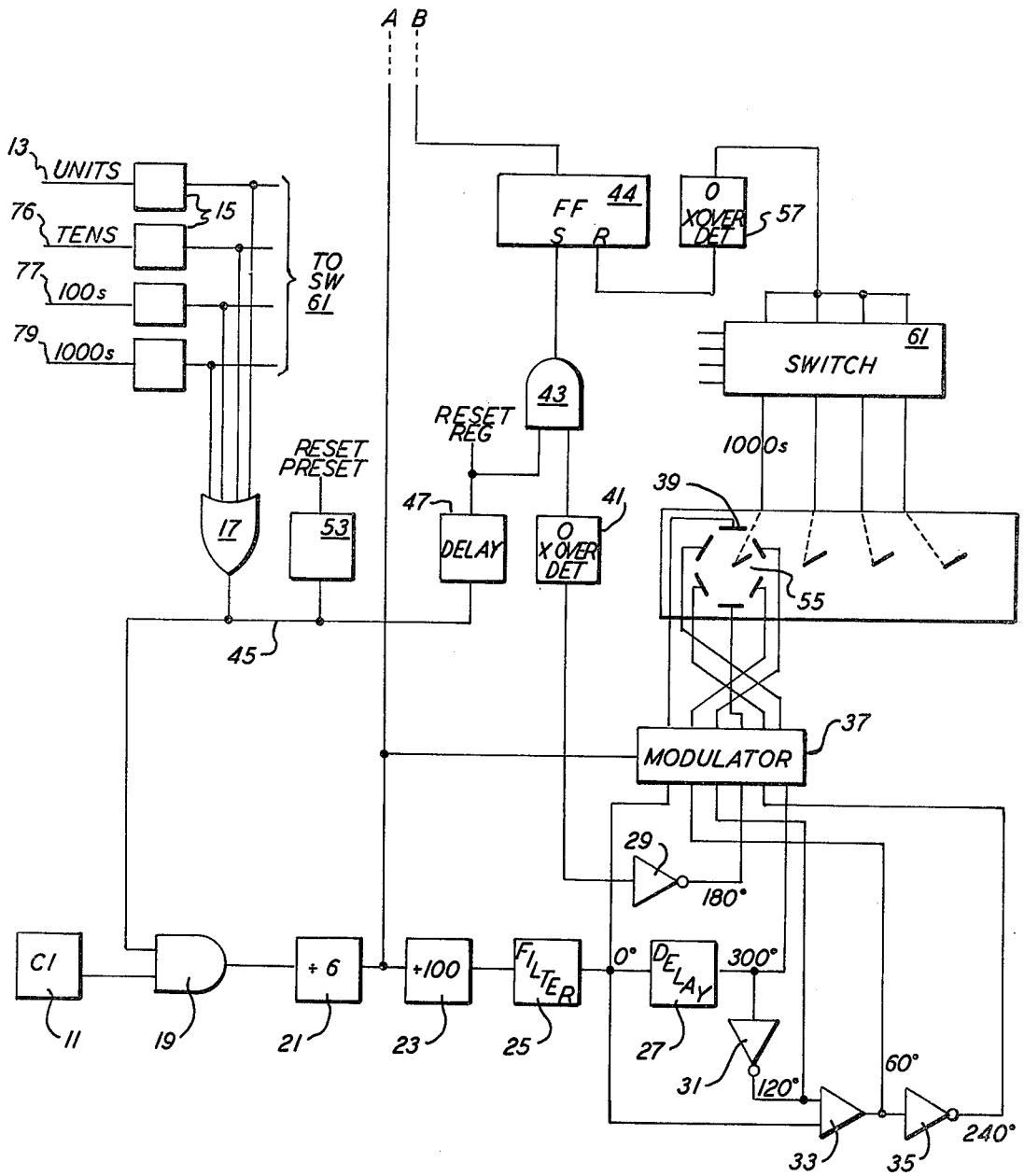

The unit shown on FIGS. 1a and 1b is a unit remotely located at the meter. When reading is not being carried out, the unit simply sits in place with a clock 11 running but not enabled. Operation is initiated from a remote location by placing a signal to ground on line 13 to request an interrogation of the units hand of the meter. This signal fires a one-shot multivibrator 15, the output of which, through an OR gate 17, enables an AND gate 19 to permit the clock to provide its output to the dials. The clock operates at 2.4 mHz which is divided in a "divide-by 6" counter 21 down to 400 KHz. This is divided down again in a "divide by 100" counter 23 to 4 KHz. The 4 KHz signal is filtered in a filter 25 to obtain a sine wave. This is the reference sine wave at 0°.

The sine wave at 0° is passed through an RC delay 27 to delay it by 60° to obtain a sine wave at an angle of 300°. The 0° signal is also inverted through an inverter 29 to obtain a signal at 180°. The signal at 300° is inverted through an inverter 31 to obtain a signal at 120°. The 120° signal and the 0° signal are added in an adder 33 to obtain a signal at an angle of 60° and that signal inverted in inverter 35 to obtain a signal at an angle of 240°. In this way six phase signals separated from each other by 60° are generated. These signals are fed to a modulator unit 37 where they are used to modulate the 400 KHz square wave. Thus there are provided as outputs six modulated 400 KHz square waves. These are supplied to the respective segments 39 of the capacitive device associated with the dials, this device being more fully described in the aforementioned U.S. Patent.

The 0° signal is also provided to a zero cross over detector 41. The output of the zero cross over detector is coupled through an AND gate 43 to the set input of a flip-flop 44. The gate 43 is enabled by the output of OR gate 17 on line 45 after a delay through a delay means 47 such as a one-shot multivibrator. This delay should be approximately 0.5 milliseconds after the field is applied to the plates 39. The flip-flop output enables an AND gate 49 to couple the 400 KHz signal into a 100 count BCD counter. This counter will be reset by the signal on line 45 coupled through an appropriate one-shot multivibrator 53 or other means to generate a short pulse for reset purposes. The counter counts the pulses until a zero cross over output signal from the hand 55 is detected in a zero cross over detector 57. This resets the flip-flop 44 disabling the gate 49. The number which is stored in the counter 51 thus represents the position of the hand 55. Which of the dials is interrogated is determined by a switch or multiplexer 61 having signal inputs from each of the four hands on the dial and having switching enabling signals obtained from the one-shot multivibrators 15. In the present case, assuming the units are being interrogated the output of the units dial will be provided to the zero cross over detector 57. The output of zero cross over detector 57 resets flip-flop 44, causing gate 49 to be disabled. The output of counter 51 will now represent the meter hand position. This output is stored in a register 62 with the output of the register coupled through drivers 75 which will provide switches closure to ground in BCD output format indicating the dial position which can then be transferred to a remote location. Note that only the most significant digit is taken out of the BCD counter 51. Also note that in the case of the units reading the counter was reset to 0.

Figure 2:
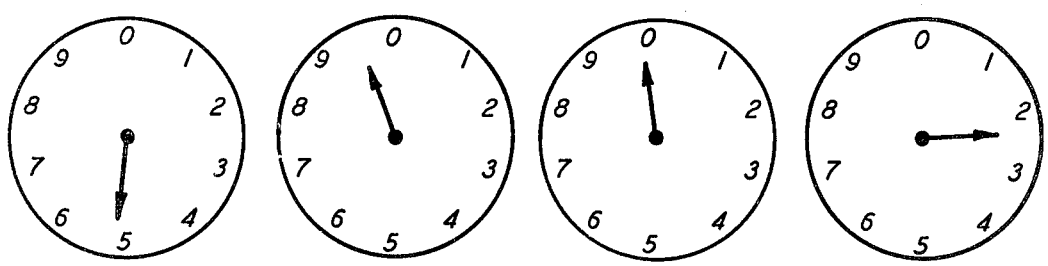
FIG. 2 is a diagram of meter dials accompanied by a table, showing operation of the present invention.

With reference to FIG. 2, assume that the reading of the least significant dial was 23 in the counter. An output of 2 would result from the register 62. In accordance with the present invention, since this output is less than 3, the counter 51 should now be preset to a count of 3 before the next dial is read. This is accomplished by means of a plurality of gates. The 10 and 20 outputs of the register are provided as inputs to an exclusive OR gate 63. The output of this gate is Anded with the $\overline{40}$ and $\overline{80}$ signals from the register 62 in an AND gate 64. Thus, AND gate 64 will have an output only when the count is 10 or 20. The $\overline{10}$, $\overline{20}$, $\overline{40}$ and $\overline{80}$ signals are Anded in an AND gate 65. This gate will have an output only when the count is 0. Finally, the output of gates 65 and 64 are ORed in an OR gate 66, which will thus have an output only for the counts 10, 20 and 0. Or, in terms of the final output, only for the dial reading 1, 2 and 0. These outputs are one input to two And gates 67 and 68 coupled as preset inputs for the first bits of the units portion of the BCD counter. The second inputs to these gates and to a plurality of remaining gates 69-74, are fed by a common preset signal developed from the one shot 53. Thus, in the example of FIG. 2 where, on the first dial reading the output was 2, a quantity of 3 will be added into the counter 51. This completes the first cycle.

The remote equipment will pick up the reading from the drivers 75 and thereafter will provide a signal on line 76 to initiate a reading of the tens. The same process will be followed. With reference to FIG. 2, now assume that 98 counts occur between the time when the flip-flop 44 is set and when it is reset. Since the counter was already at 3 the total count will be 101 and the output will be 0. With a 0 output, the counter 51 will again be preset with the count of 3. Thereafter, an input on line 77 will initiate the 100s reading. Assume that the number of counts here is 93 and with 3 added thereto the count will be 96. The output will thus be 9. With a 9 output, it is desired to subtract 3 from the next count. As indicated above, if the reading is 7, 8 or 9, such subtraction should take place. To accomplish this AND gate 81 and OR gate 83 are provided. Gate 81 has inputs coupled to the 10s output, 20s output and 40s output and will thus have an output for 70. Gate 83 has as inputs the 80 output and also to the output of gate 81. Thus, there will be an output from gate 83 for the outputs 70, 80 or 90. This is the second input to gates 69-74. Thus, when the preset signal appears, a count of 97 will be loaded into the counter 51. This is equivalent to a subtraction of 3. In other words the first 3 counts after the setting of the flip-flop 44 will return the counter 51 to 0.

A signal now appears on the line 79 initiating a reading of the 1000s dial. As shown by FIG. 2 the 1000s dial is slightly past 5. Assume that the number of counts read are 51. From this count 3 is subtracted or 97 is added to give an actual count of 48. With a count of 48 the output which is provided to the register 62 and the driver 75 will be 4. It can be seen that, were it not for the correction, the output would have been 5 and would have been incorrect.

Reviewing what has occurred it can be seen that the 10s dial has not quite reached the 0. However, since the units dial just went through 0, now being at 2, the 10s dial should have either just passed 9 or just passed 0. Obviously, there is a mechanical misalignment and the hand should be slightly passed 0 rather than slightly before 0. Through the addition which was carried out prior to reading the 10s dial this error was corrected. In the case of the 100s dial, since the 100s hand is just about to reach 0 the 1000s dial should be slightly before 5. However, due to misalignment it is slightly past 5, i.e., at 5.1. Again through the error correction scheme, by subtracting 0.3, this mechanical error is compensated. The 100s dial has the maximum correctable error. It is shown as being at 93. In actuality, it should be exactly on 9. However, even with this large error the reading obtained is correct. Consider the case where the hand for the 100s dial was exactly on 9. The addition of 3 would do no harm and the output would still be 9. The same is true in the other cases. If the 10s dial was exactly on 0 the addition of 3 would still result in a 0 output. Similarly, if the hand of the 1000s dial was at 4.9 where it should be, the subtraction of 3 would result in 4.6 and the output would still be 4. Thus, it can be seen that the additions and subtractions carried out by the present invention act to correct errors within a reasonable degree while at the same time not introducing errors if the dials happen to be correct.

What is claimed is:

1. In a device for remotely reading the positions of at least two continuously positionable indicators representing a less significant and a more significant digit in any number system, movement of the more significant of the two indicators being in a ratio of 1/N to the less significant indicator where N is the base of the number system employed, a method of correction for errors in the mechanical positions of the indicators comprising:
   (a) automatically taking readings of said indicators to one decimal place to give a reading consisting of an integer and a decimal and sequentially, with sensing means, starting with the least significant indicator and storing said reading in storage means;
   (b) for each reading after the first automatically, with adding means, adding a correction to the more significant indicator being read, to obtain a corrected reading, based on the last previous reading which will at least approximately tend to make the reading one which falls half way between two adjacent integers on said more significant indicator, assuming the more significant indicator being read is in the correct mechanical position; and
   (c) automatically supplying as the reading, from said adding means, the integer which forms part of the corrected reading.

2. The method according to claim 1 wherein the meter readings are transmitted to a central location and wherein the correction of said errors is carried out prior to transmission to said central location.

3. In a remote meter reader in which a plurality of meter dials are each read to obtain output readings for each meter dial, a method of correcting for errors in the mechanical position of the dials which comprises automatically and sequentially taking the readings of each dial starting with the least significant dial using a sensing means and storing said reading in storage means;

and, for each reading after the first reading, automatically adding a correction thereto with adding means, based on the last previous reading, which will at least approximately tend to make the reading one which falls half way between the two dial numbers which the dial being read is then traversing, assuming that the dial being read is at the correct mechanical position, whereby a mechanical error up to one half the distance between numbers on the dial will be compensated.

4. The method of claim 3 and further including:
   (a) dividing the 360° rotation of each meter dial into N segments;
   (b) determining a correction value for each segment which is at least approximately the average correction over that segment;
   (c) automatically detecting the sector in which the next least significant dial is located with said sensing means; and
   (d) correcting the reading of said dial being read by adding, with said adding means, one of the correction factors so determined as a function of the sector, in which the next least significant dial is located.

5. The method according to claim 4 wherein N is an odd number.

6. The method according to claim 5 wherein N is five, whereby the average correction in the first sector will be +0.4, the average correction in the second sector will be +0.2, the average correction in the third sector will be zero, the average correction in the fourth sector will be −0.2, and the average correction in the fifth sector will be −0.4.

7. The method according to claim 5 wherein N is three, whereby the average correction in the first sector will be +0.333, the average correction in the second sector zero and the average correction in the third sector −0.333.

8. The method according to claim 7 and further including rounding off said correction to 0.3 in the first sector and −0.3 in the third sector.

9. The method according to claim 8 wherein said dial contains the numbers 0 to 9 equally spaced thereon and where a correction of +0.3 is applied when the reading is 0, 1 or 2, no correction applied when the reading is 3, 4, 5 or 6 and a correction of −0.3 when the reading is 7, 8 or 9.

10. The method according to claim 3 wherein the meter readings are transmitted to a central location and wherein the correction of said errors is carried out prior to transmission to said central location.

11. In a remote meter reader in which a plurality of meter hands are read by generating a rotating electric field concentric with the meter dial and by detecting the phase difference between the zero cross over of a reference signal and a signal obtained from the meter hand, the phase difference being detected and converted into a numerical value, a method of correcting for errors in the mechanical position of the hand comprising sequentially taking the readings starting with the least significant dial and storing said reading to one decimal place in storage means, and for each reading after the first reading adding 0.3 if the previous reading was 0, 1 or 2 and subtracting 0.3 if the previous reading was 7, 8 or 9 in said storage means.

12. The method of claim 11 wherein said phase difference is converted into a numerical value by counting a clock signal in a counter and wherein said step of adding 0.3 is accomplished by pre-setting the counter with a 3 and the step of subtracting 0.3 by pre-setting said counter with a count of −3.

13. The method of claim 12 and further including the step of waiting a predetermined time after the application of the electric field to the meter dial before making any phase comparisons.

14. The method according to claim 11 wherein the meter readings are transmitted to a central location and wherein the correction of said errors is carried out prior to transmission to said central location.

15. In a remote meter reader for reading a plurality of meter hands which includes means for generating multiphase AC signals; means for utilizing said signals to generate a rotating electric field concentric with the meter dial; means for detecting the phase difference between the signal impressed upon a meter hand by said electric field and a reference one of the generated phases; and means for converting the phase difference into a numerical value, the improvement comprising:
   (a) means to cause the plurality of meter hands to be read, to one decimal place in order starting with the least significant meter hand; and
   (b) means to add to said means for converting a value of 0.3 when the previous reading was 0, 1 or 2, and to subtract from said converting means 0.3 if the previous reading was 7, 8 or 9.

16. The improvement according to claim 15 wherein said means for converting comprise a clock; a counter; means to enable said counter to receive pulses from said clock between a zero cross-over of the reference phase and the zero crossover of the signal detected at a meter hand whereby the count in said counter will be proportional to said phase difference, and wherein said means for adding and subtracting comprise means for determining for each reading, whether the count in said counter corresponds to a dial reading of 0, 1 or 2 and for presetting said counter prior to the next reading with a count of 3 when such is detected and for determining whether said count represents a reading of 7, 8 or 9 and presetting said counter with a −3 prior to the next reading when such is detected.

17. The improvement according to claim 16 and further including means to prevent enablement of said counter until the electric field has been applied to meter hand for a predetermined period of time.

18. The improvement according to claim 16 and further including means for storing the value in said counter after a reading has been taken and means to transmit said value to a remote central location.

19. The improvement according to claim 15 wherein all of said means are located at the location of said meter whereby a corrected meter reading can be transmitted to a remote central location.

20. In a device for remotely reading the positions of at least two continuously positionable indicators representing a less significant and a more significant digit in any number system, movement of the more significant of the two indicators being in a ratio of 1/N to the less significant indicator where N is the base of the number system employed, apparatus for correcting for errors in the mechanical positions of the indicators comprising:
   (a) means for sequentially taking readings of said indicators to one decimal place to give a reading consisting of an interger and a decimal starting with the least significant indicator;
   (b) means for adding a correction to each reading after the first, to obtain a corrected reading, based on the last previous reading which will at least approximately tend to make the reading one which falls half way between two adjacent integers on said indicator being read, assuming the indicator being read is in the correct mechanical position; and (c) means for supplying as the reading, the integer which forms part of the corrected reading.

21. In a remote meter reader in which a plurality of meter dials are each read to obtain output readings for each meter dial, apparatus for correcting errors in the mechanical position of the dials which comprises:

(a) means for sequentially taking readings of each dial starting with the least significant dial; and (b) means for adding a correction to each reading after the first reading, based on the last previous reading, which will approximately tend to make the reading one which falls half way between the two dial numbers which the dial being read is then traversing, assuming that the dial being read is at the correct mechanical position, whereby a mechanical error up to one half the distance between numbers on the dial will be compensated.

22. Apparatus according to claim 21 wherein each meter dial is divided into N segments and wherein a correction value for each segment which is at least approximately the average correction over that segment is predetermined to be a value which is approximately the average correction over that segment, and further including means for detecting the sector in which the last previous dial which was read is located and wherein said means for correcting the reading include means for adding one of said correction factors to the reading of said dial being read as a function of the sector in which said last previous dial is located.

23. Apparatus according to claim 22 wherein N is an odd number.

24. Apparatus according to claim 23 wherein N is five, whereby the average correction in the first sector will be +0.4, the average correction in the second sector will be +0.2, the average correction in the third sector will be zero, the average correction in the fourth sector will be −0.2, and the average correction in the fifth sector will be −0.4.

25. Apparatus according to claim 23 wherein N is three, whereby the average correction in the first sector will be +0.333, the average correction in the second sector zero and the average correction in the third sector −0.333.

26. Apparatus according to claim 25 and further including rounding off said correction to 0.3 in the first sector and −0.3 in the third sector.

27. Apparatus according to claim 26 wherein said dial contains the numbers 0 to 9 equally spaced thereon and where a correction of +0.3 is applied when the reading is 0, 1 or 2, no correction applied when the reading is 3, 4, 5 or 6 and a correction of −0.3 when the reading is 7, 8 or 9.

* * * * *